United States Patent
Singh et al.

(10) Patent No.: US 10,910,119 B2
(45) Date of Patent: Feb. 2, 2021

(54) SELF-ALIGNMENT METHOD OF NEUTRON ABSORBING APPARATUS FOR REACTIVITY MITIGATION IN NUCLEAR FUEL STORAGE SYSTEMS

(71) Applicant: Holtec International, Camden, NJ (US)

(72) Inventors: Krishna P. Singh, Hobe Sound, FL (US); Stephen J. Agace, Voorhees, NJ (US)

(73) Assignee: HOLTEC INTERNATIONAL, Marlton, NJ (US)

( * ) Notice: Subject to any disclaimer, the term of this patent is extended or adjusted under 35 U.S.C. 154(b) by 13 days.

(21) Appl. No.: 16/513,815

(22) Filed: Jul. 17, 2019

(65) Prior Publication Data

US 2019/0362863 A1 Nov. 28, 2019

Related U.S. Application Data

(63) Continuation of application No. 15/634,408, filed on Jun. 27, 2017, now Pat. No. 10,418,137.

(60) Provisional application No. 62/355,057, filed on Jun. 27, 2016.

(51) Int. Cl.
*G21C 19/07* (2006.01)
*G21C 19/40* (2006.01)
*G21F 5/012* (2006.01)
*G21F 1/08* (2006.01)
*G21F 3/00* (2006.01)

(52) U.S. Cl.
CPC ............ *G21C 19/07* (2013.01); *G21C 19/40* (2013.01); *G21F 5/012* (2013.01); *G21F 1/08* (2013.01); *G21F 3/00* (2013.01)

(58) Field of Classification Search
CPC ........ G21C 19/06; G21C 19/07; G21C 19/40; G21F 5/012
See application file for complete search history.

(56) References Cited

U.S. PATENT DOCUMENTS

| | | | |
|---|---|---|---|
| 4,010,375 A | 3/1977 | Wachter et al. |
| 4,096,392 A | 6/1978 | Rubinstein et al. |
| 4,115,700 A | 9/1978 | Groves |
| 4,156,147 A | 5/1979 | Dooher et al. |
| 4,198,322 A | 4/1980 | Storm |
| 4,213,883 A | 7/1980 | Owens |
| 4,218,622 A | 8/1980 | Forsyth et al. |

(Continued)

*Primary Examiner* — Sharon M Davis
(74) *Attorney, Agent, or Firm* — The Belles Group, P.C.

(57) ABSTRACT

A neutron absorber apparatus for use in restoring reactivity control to a nuclear fuel rack. The apparatus comprises an elongated tubular insert assembly configured for insertion in a storage cell of the rack. First and second absorber plates, each formed of a boron-containing material, are coupled together by upper and lower stiffening bands at the insert extremities and form a longitudinally-extending cavity configured for receiving a fuel assembly. The absorber plates and stiffening bands may have a rectilinear cross sectional configuration in one embodiment. At least one elastically deformable locking protrusion mounted proximate to the lower end of the absorber plates lockingly engages an available lower edge disposed in the cell sidewall above its bottom end. This fixes the tubular insert axially in the cell, thereby preventing its withdrawal after installing the insert. In one embodiment, the edge may be the bottom of existing absorber sheathing in the cell.

20 Claims, 12 Drawing Sheets

(56) References Cited

U.S. PATENT DOCUMENTS

| | | | |
|---|---|---|---|
| 4,225,467 A | | 9/1980 | McMurtry et al. |
| 4,243,886 A | | 1/1981 | Untermyer, II |
| 4,287,145 A | | 9/1981 | McMurtry et al. |
| 4,313,973 A | | 2/1982 | McMurtry et al. |
| 4,457,888 A | * | 7/1984 | Vickrey, Jr. ............ G21C 19/07 206/443 |
| 4,900,505 A | | 2/1990 | Machado et al. |
| 4,960,560 A | | 10/1990 | Machado et al. |
| 5,245,641 A | | 9/1993 | Machado et al. |
| 5,361,281 A | * | 11/1994 | Porowski ............... G21C 19/07 376/272 |
| 5,479,463 A | | 12/1995 | Roberts |
| 5,629,964 A | | 5/1997 | Roberts |
| 5,841,825 A | | 11/1998 | Roberts |
| 6,118,838 A | * | 9/2000 | Robert ................... G21C 19/40 376/272 |
| 6,442,227 B1 | | 8/2002 | Iacovino et al. |
| 6,741,669 B2 | | 5/2004 | Lindquist |
| 8,158,962 B1 | | 4/2012 | Rosenbaum et al. |
| 8,681,924 B2 | | 3/2014 | Rosenbaum et al. |
| 10,418,137 B2 | * | 9/2019 | Singh ..................... G21C 19/07 |
| 2001/0016026 A1 | | 8/2001 | Tennie |
| 2003/0081714 A1 | | 5/2003 | Lindquist |
| 2004/156466 A1 | | 8/2004 | Lindquist |
| 2011/0033019 A1 | | 2/2011 | Rosenbaum et al. |
| 2011/0142189 A1 | * | 6/2011 | Foussard ................ G21C 19/40 376/272 |
| 2013/0343503 A1 | | 12/2013 | Agace et al. |

\* cited by examiner

SELF-ALIGNMENT METHOD OF NEUTRON ABSORBING APPARATUS FOR REACTIVITY MITIGATION IN NUCLEAR FUEL STORAGE SYSTEMS

CROSS-REFERENCE TO RELATED APPLICATIONS

The present application is a continuation of U.S. patent application Ser. No. 15/634,408 filed Jun. 27, 2017, which claims the benefit of priority to U.S. Provisional Application No. 62/355,057 filed Jun. 27, 2016. The foregoing applications are incorporated herein by reference in their entireties.

BACKGROUND

The present invention generally relates to storage of nuclear fuel, and more particularly to an improved nuclear fuel storage rack system for use in a fuel pool in a nuclear generation plant.

A conventional free-standing, high density nuclear fuel storage rack is a cellular structure typically supported on a set of pedestals from the floor or bottom slab of the water-filled spent fuel pool. The bottom extremity of each fuel storage cell is welded to a common baseplate which serves to provide the support surface for the upwardly extending vertical storage cells and stored nuclear fuel therein. The cellular region comprises an array of narrow prismatic cavities formed by the cells which are each sized to accept a single nuclear fuel assembly comprising a plurality of new or spent nuclear fuel rods. The term "active fuel region" denotes the vertical space above the baseplate within the rack where the enriched uranium is located.

High density fuel racks used to store used nuclear fuel employ a neutron absorber material to control reactivity. The commercially available neutron absorbers are typically in a plate or sheet form and are either metal or polymer based. The polymeric neutron absorbers commonly used in the industry were sold under trade names Boraflex and Tetrabor, with the former being the most widely used material in the 1980s. The neutron absorber panels have been typically installed on the four walls of the storage cells encased in an enveloping sheathing made of thin gage stainless steel attached to the cell walls in the active fuel region. Unfortunately, the polymeric neutron absorbers have not performed well in service. Widespread splitting and erosion of Boraflex and similar degradation of Tetrabor have been reported in the industry, forcing the plant owners to resort to reducing the density of storage (such as a checkered board storage arrangement) thereby causing an operational hardship to the plant.

A neutron absorber apparatus is desired which can be retrofit in existing fuel racks suffering from neutron absorber material degradation in order to fully restore reactivity reduction capacity of the storage cells.

SUMMARY

Embodiments of the present invention provide a neutron absorber insert system which can be readily added in situ to existing storage cells of the fuel rack having degraded neutron absorbers and reduced reactivity reduction capacity. The system comprises a plurality of neutron absorber apparatuses which may be in the form of absorber inserts configured for direct insertion into and securement to the fuel storage cells. The inserts have a low-profile small and thin cross sectional footprint which does not significantly reduce the storage capacity of each storage cell. A fuel assembly may be inserted into a central longitudinally-extending cavity of the insert and removed therefrom without first removing the insert. The inserts include a locking feature which is automatically deployed and secures the insert in the cell, as further described herein. Advantageously, the absorber insert may utilize an available edge surface on an existing storage tube of the fuel rack which can be engaged by the locking feature of the absorber tube. This eliminates the need for modifying the existing fuel rack in order to accommodate the insert, thereby saving time and expense. In one embodiment, the edge surface may be part of an existing neutron absorber sheathing structure on the fuel storage tube. The inserts may advantageously be deployed in the existing fuel rack storage cells via remote handling equipment such as cranes while the rack remains submerged underwater in the spent fuel pool.

In one aspect, a neutron absorber apparatus for a nuclear fuel storage system includes: a fuel rack comprising a vertical longitudinal axis and plurality of longitudinally-extending storage cells, each cell comprising a plurality of cell sidewalls defining a cell cavity configured for storing nuclear fuel therein; a sheath integrally attached to a first cell sidewall of a first cell and defining a sheathing cavity configured for holding a neutron absorber material; an absorber insert comprising plural longitudinally-extending neutron absorber plates each comprising a neutron absorber material, the insert disposed in the first cell; and an elastically deformable locking protrusion disposed on one of the absorber plates, the locking protrusion resiliently movable between an outward extended position and an inward retracted position; the locking protrusion lockingly engaging the sheath to axially restrain the insert and prevent removal of the insert from the first cell.

In another aspect, a neutron absorber apparatus for a nuclear fuel storage system includes: a fuel rack comprising a vertical longitudinal axis and plurality of longitudinally-extending storage tubes each defining a cell, each storage tube comprising a plurality of tube sidewalls defining a primary cavity; an absorber insert insertably disposed in the primary cavity of a first storage tube, the absorber insert comprising a plurality of absorber plates arranged to form a longitudinally-extending neutron absorber tube having an exterior and an interior defining a secondary cavity configured for storing a nuclear fuel assembly therein, each absorber plate formed of a neutron absorber material; an upper stiffening band extending perimetrically around an upper end of the absorber tube, the upper stiffening band attached to the exterior of the absorber tube and protruding laterally outwards beyond the absorber plates to engage the tube sidewalls of the first storage tube; a lower stiffening band extending perimetrically around a lower end of the absorber tube and disposed at least partially inside the secondary cavity, the lower stiffening band attached to the interior of the absorber tube; wherein the absorber plates of the insert assembly are spaced laterally apart from the tube sidewalls of the first storage tube by the upper stiffening band forming a clearance gap therebetween.

In another aspect, a neutron absorber apparatus for a nuclear fuel storage system includes: a fuel rack comprising a plurality of longitudinally-extending storage cells, each cell comprising a plurality of cell walls defining a cell cavity for storing nuclear fuel; a longitudinally-extending absorber tube insertably disposed in a first cell of the fuel rack and having an exterior and an interior, the absorber tube comprising: an elongated chevron-shaped first absorber plate comprising a first section and a second section angularly bent to the first section along a bend line of the first absorber plate; an elongated chevron-shaped second absorber plate comprising a third section and a fourth section angularly bent to the third section along a bend line of the second absorber plate; an upper stiffening band extending perimetrically around upper ends of the first and second absorber plates and coupling the first and second absorber plates together.

Further areas of applicability of the present invention will become apparent from the detailed description provided hereinafter.

BRIEF DESCRIPTION OF THE DRAWINGS

The features of the exemplary embodiments will be described with reference to the following drawings where like elements are labeled similarly, and in which.

Figure 1:
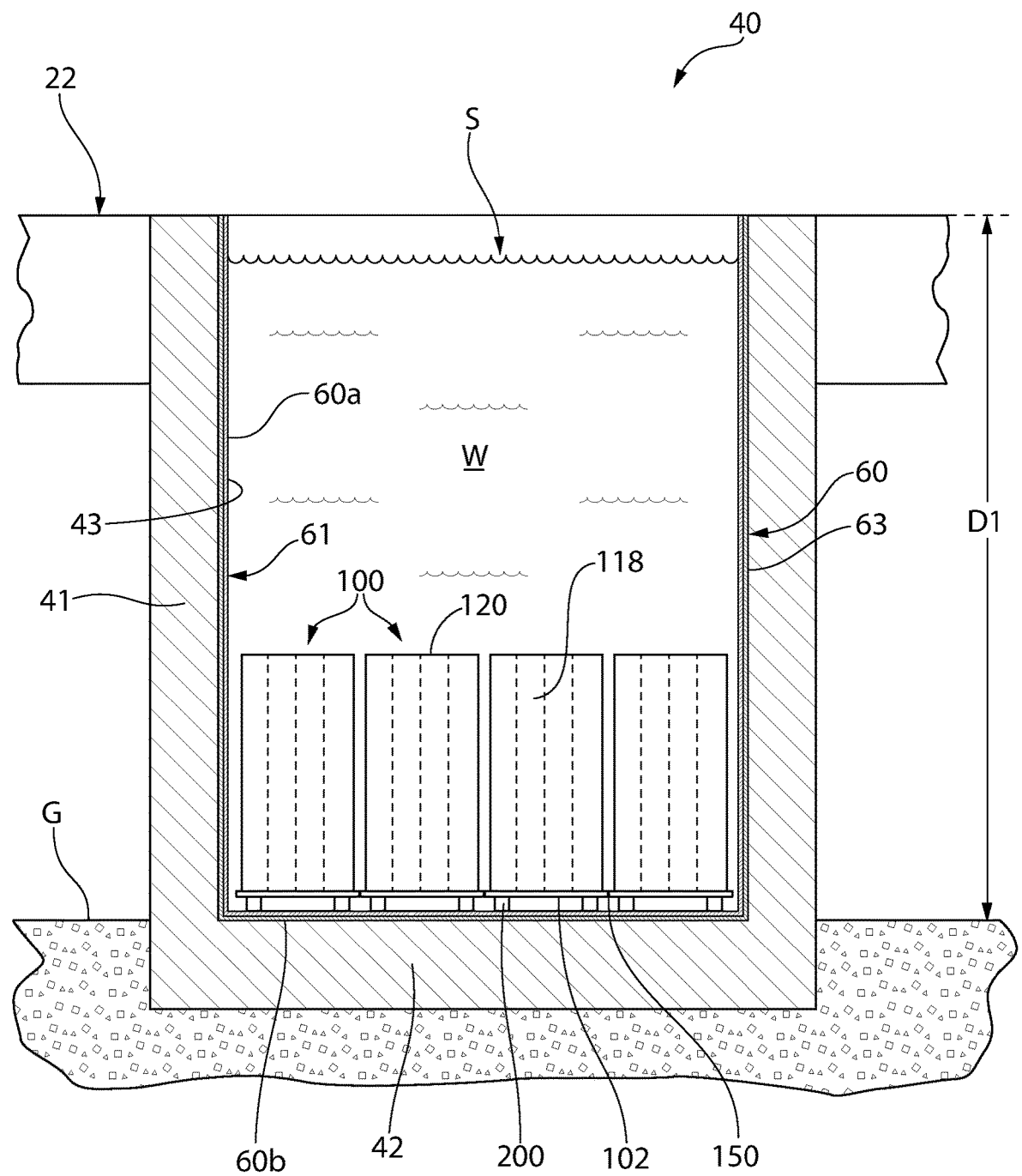
FIG. 1 is a side elevation view of a conventional nuclear fuel storage system including a fuel pool and fuel racks.
Figure 2:
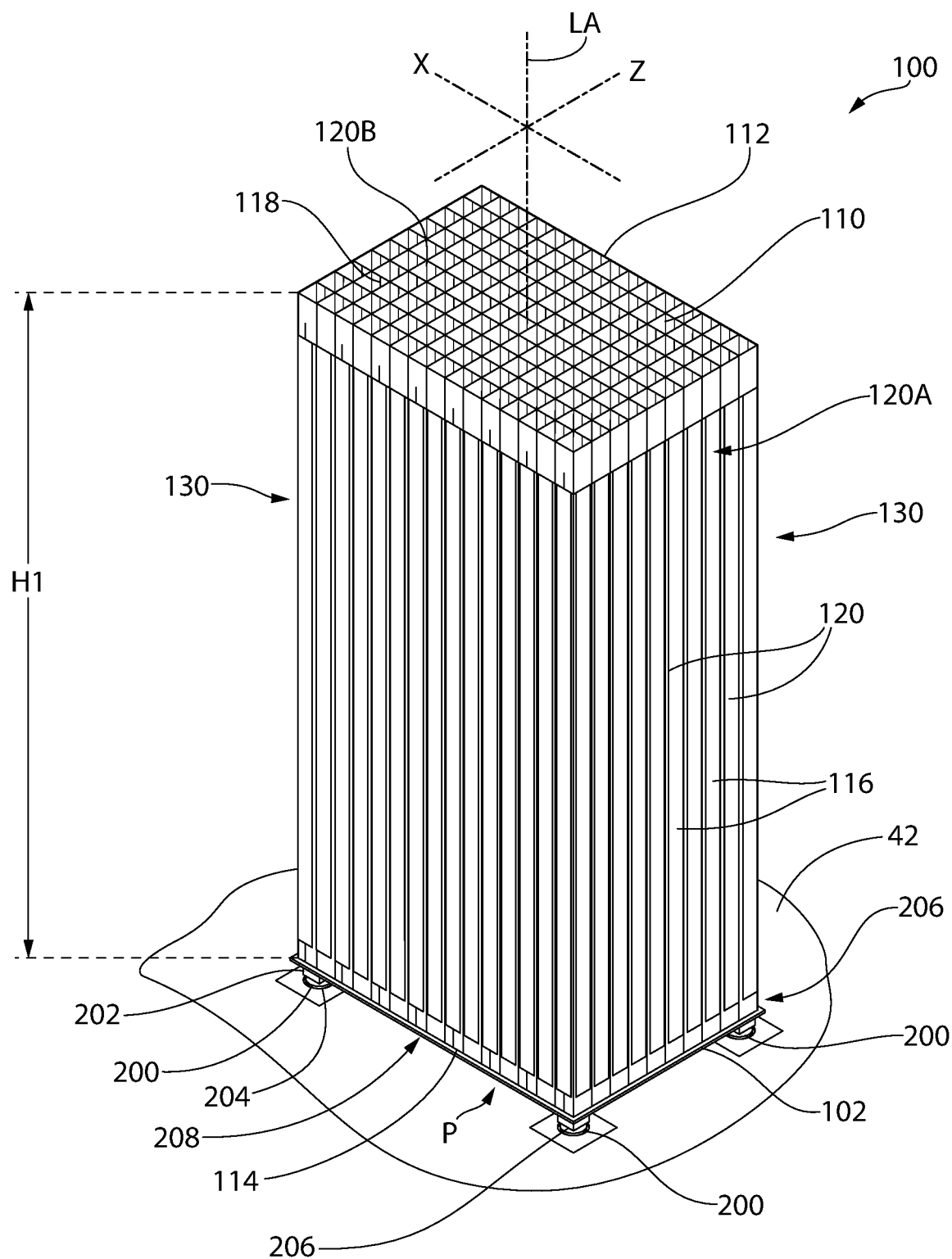
FIG. 2 is a perspective view of a fuel rack.

All drawings are schematic and not necessarily to scale. Parts shown and/or given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features. Furthermore, all features and designs disclosed herein may be used in combination even if not explicitly described as such.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. It will be appreciated that any numerical ranges that may be described herein shall be understood to include the lower and upper numerical terminus values or limits of the cited range, and any numerical values included in the cited range may serve as the terminus values.

Referring to FIGS. 1-5, a nuclear facility which may be a nuclear generating plant includes a fuel pool 40 according to the present disclosure configured for storing a plurality of nuclear fuel racks 100. The fuel pool 40 may comprise a plurality of vertical sidewalls 41 rising upwards from an adjoining substantially horizontal bottom base wall or slab 42 (recognizing that some slope may intentionally be provided in the upper surface of the base slab for drainage toward a low point if the pool is to be emptied and rinsed/decontaminated at some time and due to installation tolerances). The base slab 42 and sidewalls 41 may be formed of reinforced concrete in one non-limiting embodiment. The fuel pool base slab 42 may be formed in and rest on the soil sub-grade 26, the top surface of which defines grade G. In this embodiment illustrated in the present application, the sidewalls are elevated above grade. The base slab 42 may be located at grade G as illustrated, below grade, or elevated above grade. In other possible embodiments contemplated, the base slab 42 and sidewalls 41 may alternatively be buried in sub-grade 26 which surrounds the outer surfaces of the sidewalls. Any of the foregoing arrangements or others may be used depending on the layout of the nuclear facility and does not limit of the invention.

In one embodiment, the fuel pool 40 may have a rectilinear shape in top plan view. Four sidewalls 41 may be provided in which the pool has an elongated rectangular shape (in top plan view) with two longer opposing sidewalls and two shorter opposing sidewalls (e.g. end walls). Other configurations of the fuel pool 40 are possible such as square shapes, other polygonal shapes, and non-polygonal shapes.

Figure 5:
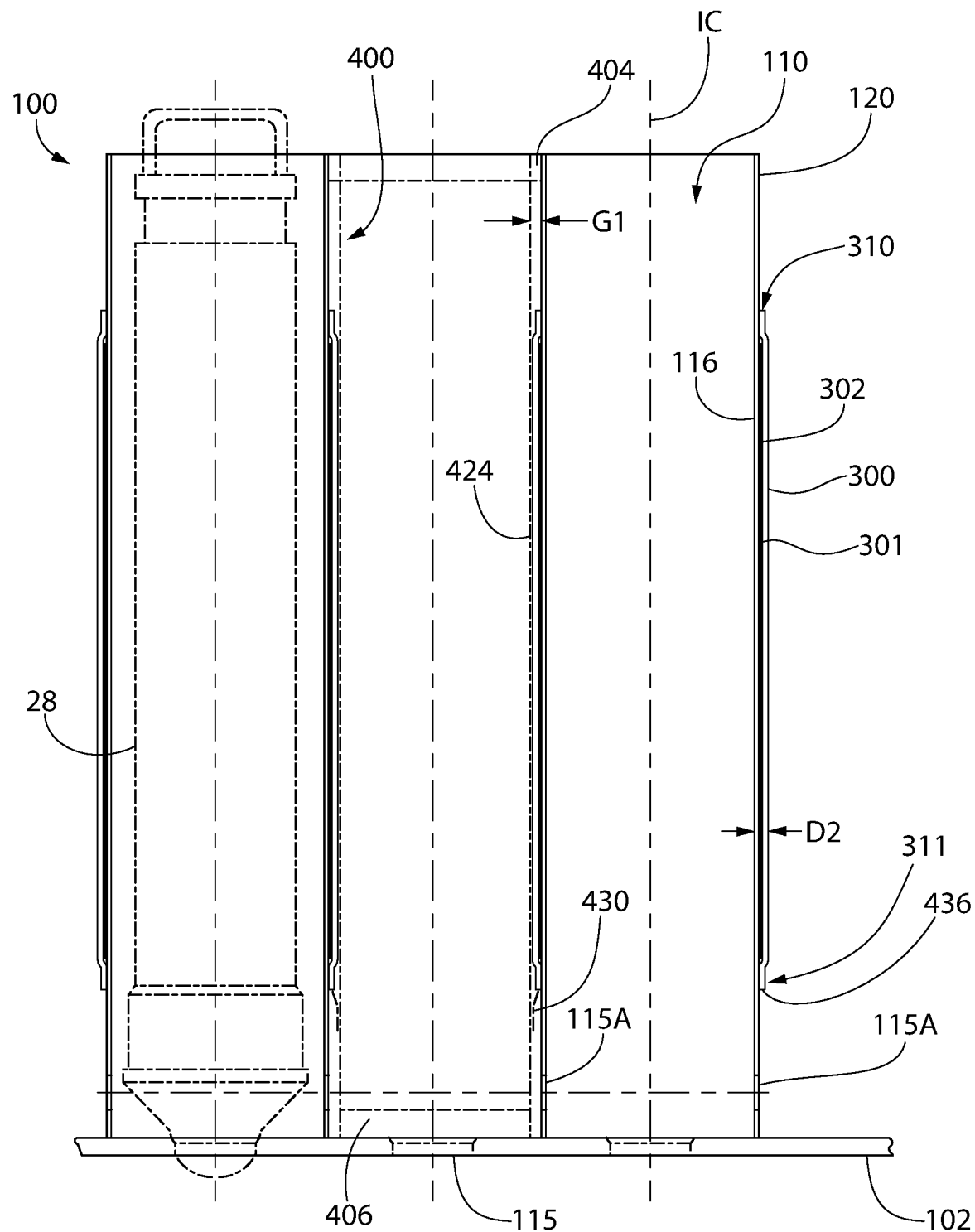
FIG. 5 is a side longitudinal cross-sectional view of a portion of the fuel rack.

The sidewalls 41 and base slab 42 of the fuel pool 40 define an upwardly open well or cavity 43 configured to hold cooling pool water W and the plurality of submerged nuclear fuel racks 100 each holding multiple nuclear fuel bundles or assemblies 28 (a typical one shown in phantom view seated in a fuel rack cell in FIG. 5). Each fuel assembly 28 contains multiple individual new or spent uranium fuel rods. Fuel assemblies are further described in commonly assigned U.S. patent application Ser. No. 14/413,807 filed Jul. 9, 2013, which is incorporated herein by reference in its entirety. Typical fuel assemblies 28 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each. The fuel racks 100 storing the fuel assemblies are emplaced on the base slab 42 in a high-density arrangement in the horizontally-abutting manner as further described herein.

The fuel pool 40 extends from an operating deck 22 surrounding the fuel pool 40 downwards to a sufficient vertical depth D1 to submerge the fuel assemblies 28 in the fuel rack (see, e.g. FIG. 6) beneath the surface level S of the pool water W for proper radiation shielding purposes. The substantially horizontal operating deck 22 that circumscribes the sidewalls 41 and pool 40 on all sides in one embodiment may be formed of steel and/or reinforced concrete. In one implementation, the fuel pool may have a depth such that at least 10 feet of water is present above the top of the fuel assembly. Other suitable depths for the pool and water may be used of course. The surface level of pool water W (i.e. liquid coolant) in the pool 40 may be spaced below the operating deck 22 by a sufficient amount to prevent spillage onto the deck during fuel assembly loading or unloading operations and to account to seismic event. In one non-limiting embodiment, for example, the surface of the operating deck 22 may be at least 5 feet above the maximum 100 year flood level for the site in one embodiment. The fuel pool 40 extending below the operating deck level may be approximately 40 feet or more deep (e.g. 42 feet in one embodiment). The fuel pool is long and wide enough to accommodate as many fuel racks 100 and fuel assemblies 28 stored therein as required. There is sufficient operating deck space around the pool to provide space for the work crew and for staging necessary tools and equipment for the facility's maintenance. There may be no penetrations in the fuel pool 40 within the bottom 30 feet of depth to prevent accidental draining of water and uncovering of the fuel.

In some embodiments, a nuclear fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877, 217 filed Oct. 7, 2015, which is incorporated herein by reference in its entirety.

The liner system in one embodiment may comprise one or more liners 60 attached to the inner surfaces 63 of the fuel pool sidewalls 41 and the base slab 42. The inside surface 61 of liner is contacted and wetted by the fuel pool water W. The liner 60 may be made of any suitable metal of suitable thickness T2 which is preferably resistant to corrosion, including for example without limitation stainless steel, aluminum, or other. Typical liner thicknesses T2 may range from about and including 3/16 inch to 5/16 inch thick. Typical stainless steel liner plates include ASTM 240-304 or 304L.

In some embodiments, the liner 60 may be comprised of multiple substantially flat metal plates or sections which are hermetically seal welded together via seal welds along their contiguous peripheral edges to form a continuous liner system completely encapsulating the sidewalls 41 and base slab 42 of the fuel pool 40 and impervious to the egress of pool water W. The liner 60 extends around and along the vertical sidewalls 41 of the fuel pool 40 and completely across the horizontal base slab 42 to completely cover the wetted surface area of the pool. This forms horizontal sections 60b and vertical sections 60a of the liner to provide an impervious barrier to out-leakage of pool water W from fuel pool 40. The horizontal sections of liners 60b on the base slab 42 may be joined to the vertical sections 60a along perimeter corner seams therebetween by hermetic seal welding. The liner 60 may be fixedly secured to the base slab 42 and sidewalls 41 of the fuel pool 40 by any suitable method such as fasteners.

With continuing reference to FIGS. 1-5, the fuel rack 100 is a cellular upright module or unit. Fuel rack 100 may be a high density, tightly packed non-flux type rack as illustrated which is designed to be used with fuel assemblies that do not require the presence of a neutron flux trap between adjacent cells 110. Thus, the inclusion of neutron flux traps (e.g. gaps) in fuel racks when not needed is undesirable because valuable fuel pool floor area is unnecessarily wasted. Of course, both non-flux and flux fuel rack types may be stored side by side in the same pool using the seismic-resistant fuel storage system according to the present disclosure. The invention is therefore not limited to use of any particular type of rack.

Fuel rack 100 defines a vertical longitudinal axis LA and comprises a grid array of closely packed open cells 110 formed by a plurality of adjacent elongated storage tubes 120 arranged in parallel axial relationship to each other. The rack comprises peripherally arranged outboard tubes 120A which define a perimeter of the fuel rack and inboard tubes 120B located between the outboard tubes. Tubes 120 are coupled at their bottom ends 114 to a planar top surface of a baseplate 102 and extend upwards in a substantially vertical orientation therefrom. In this embodiment, the vertical or central axis of each tube 120 is not only substantially vertical, but also substantially perpendicular to the top surface of the baseplate 102. In one embodiment, tubes 120 may be fastened to baseplate 102 by welding and/or mechanical coupling such as bolting, clamping, threading, etc.

Tubes 120 include an open top end 112 for insertion of fuel assemblies, bottom end 114, and a plurality of longitudinally extending vertical sidewalls 116 ("cell walls") between the ends and defining a tube or cell height H1. Each tube 120 defines an internal cell cavity 118 extending longitudinally between the top and bottom ends 112, 114. In the embodiment shown in FIG. 2A-B, four tube sidewalls 116 arranged in rectilinear polygonal relationship are provided forming either a square or rectangular tube 120 in lateral or transverse cross section (i.e. transverse or orthogonal to longitudinal axis LA) in plan or horizontal view (see also FIG. 3). Cells 110 and internal cavities 118 accordingly have a corresponding rectangular configuration in lateral cross section. The top ends of the tubes 120 are open so that a fuel assembly can be slid down into the internal cavity 118 formed by the inner surfaces of the tube sidewalls 116. Each cell 110 and its cavity 118 are configured for holding only a single nuclear fuel assembly 28. Tubes 120 may be made of any suitable preferably corrosion resistant metal, such as without limitation stainless steel or others. Baseplate 102 may be made of a similar or different corrosion resistant metal.

It will be appreciated that each tube 120 can be formed as a single unitary structural component that extends the entire desired height H1 or can be constructed of multiple partial height tubes that are vertically stacked and connected together such as by welding or mechanical means which collectively add up to the desired height H1. It is preferred that the height H1 of the tubes 120 be sufficient so that the entire height of a fuel assembly may be contained within the tube when the fuel assembly is inserted into the tube. The top ends 112 of tubes 120 may preferably but not necessarily terminate in substantially the same horizontal plane (defined perpendicular to longitudinal axis LA) so that the tops of the tube are level with each other. The baseplate 102 at the bottom ends 114 of the tubes defines a second horizontal reference plane HR.

As best shown in FIGS. 2A-B, tubes 120 are geometrically arranged atop the baseplate 102 in rows and columns along the Z-axis and X-axis respectively. Any suitable array size including equal or unequal numbers of tubes in each row and column may be provided depending on the horizontal length and width of the pool base slab 42 and number of fuel racks 100 to be provided. In some arrangements, some or all of the fuel racks 100 may have unequal lateral width and lateral length as to best make use of a maximum amount of available slab surface area as possible for each installation.

For convenience of reference, the outward facing sidewalls 116 of the outboard tubes 120A may be considered to collectively define a plurality of lateral sides 130 of the fuel rack 100 extending around the rack's perimeter as shown in FIGS. 2A-B.

Referring to FIGS. 1-5, each fuel rack 100 comprises a plurality of legs or pedestals 200 which support rack from the base slab 42 of the fuel pool 40. Pedestals 200 each have a preferably flat bottom end 204 to engage the pool base slab 42 and a top end 202 fixedly attached to the bottom of the baseplate 102. The pedestals 200 protrude downwards from baseplate 102. This elevates the baseplates 102 of the rack off the base slab 42, thereby forming a gap therebetween which defines a bottom flow plenum P beneath rack 100. The plenum P allows cooling water W in the pool to create a natural convective circulation flow path through each of the fuel storage tubes 120 (see e.g. flow directional arrows in FIG. 5). A plurality of flow holes 115 are formed in the rack through baseplate 102 in a conventional manner to allow cooling water to flow upwards through the cavity 118 of each tube 120 and outward through the open top ends 112 of the tubes. Commonly owned U.S. patent application Ser. No. 14/367,705 filed Jun. 20, 2014 shows fuel rack baseplates with flow holes, and is incorporated herein by reference in its entirety. The pool water W flowing through the tubes is heated by the nuclear fuel in fuel assemblies, thereby creating the motive force driving the natural thermal convective flow scheme.

Figure 3:
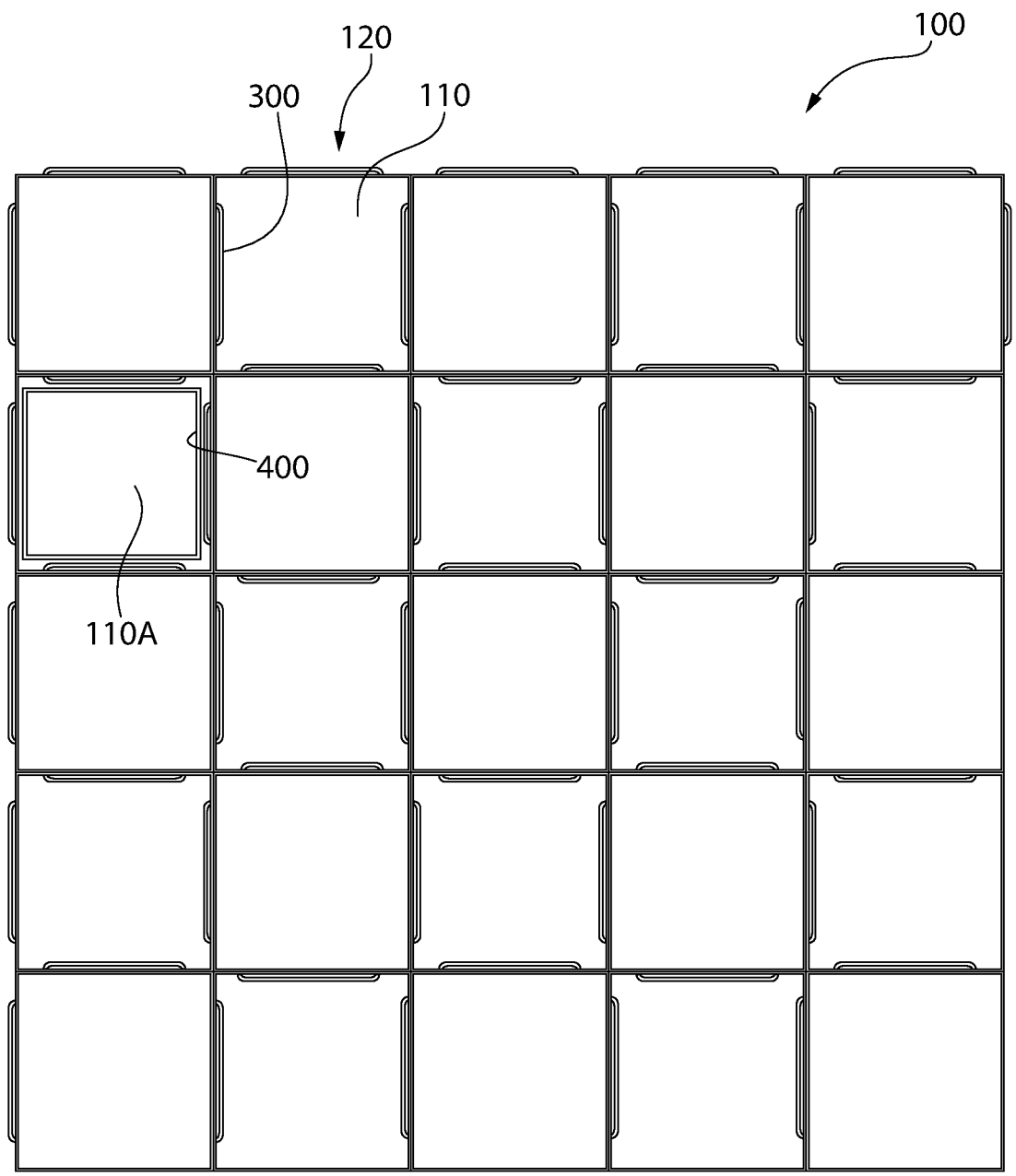
FIG. 3 is transverse cross-sectional view of the fuel rack.

Referring now then to FIGS. 3 and 5, flow holes 115 create passageways from below the base plate 102 into the cells 110 formed by the tubes 120. Preferably, a single flow hole 115 is provided for each cell 110, however, more may be used as needed to create sufficient flow through the tubes. The flow holes 115 are provided as inlets to facilitate natural thermosiphon flow of pool water through the cells 110 when fuel assemblies having a heat load are positioned therein. More specifically, when heated fuel assemblies are positioned in the cells 110 in a submerged environment, the water within the cells 110 surrounding the fuel assemblies becomes heated, thereby rising due to decrease in density and increased buoyancy creating a natural upflow pattern. As this heated water rises and exits the cells 110 via the tube open top ends 112 (see FIG. 1), cooler water is drawn into the bottom of the cells through the flow holes 115. This heat induced water flow and circulation pattern along the fuel assemblies then continues naturally to dissipate heat generated by the fuel assemblies. Pedestals 200 may therefore have a height selected to form a bottom flow plenum P of generally commensurate height to ensure that sufficient thermally-induced circulation is created to adequately cool the fuel assembly. In one non-limiting example, the height of the plenum P may be about 2 to 2.5 inches (including the listed values and those therebetween of this range).

Figure 4:
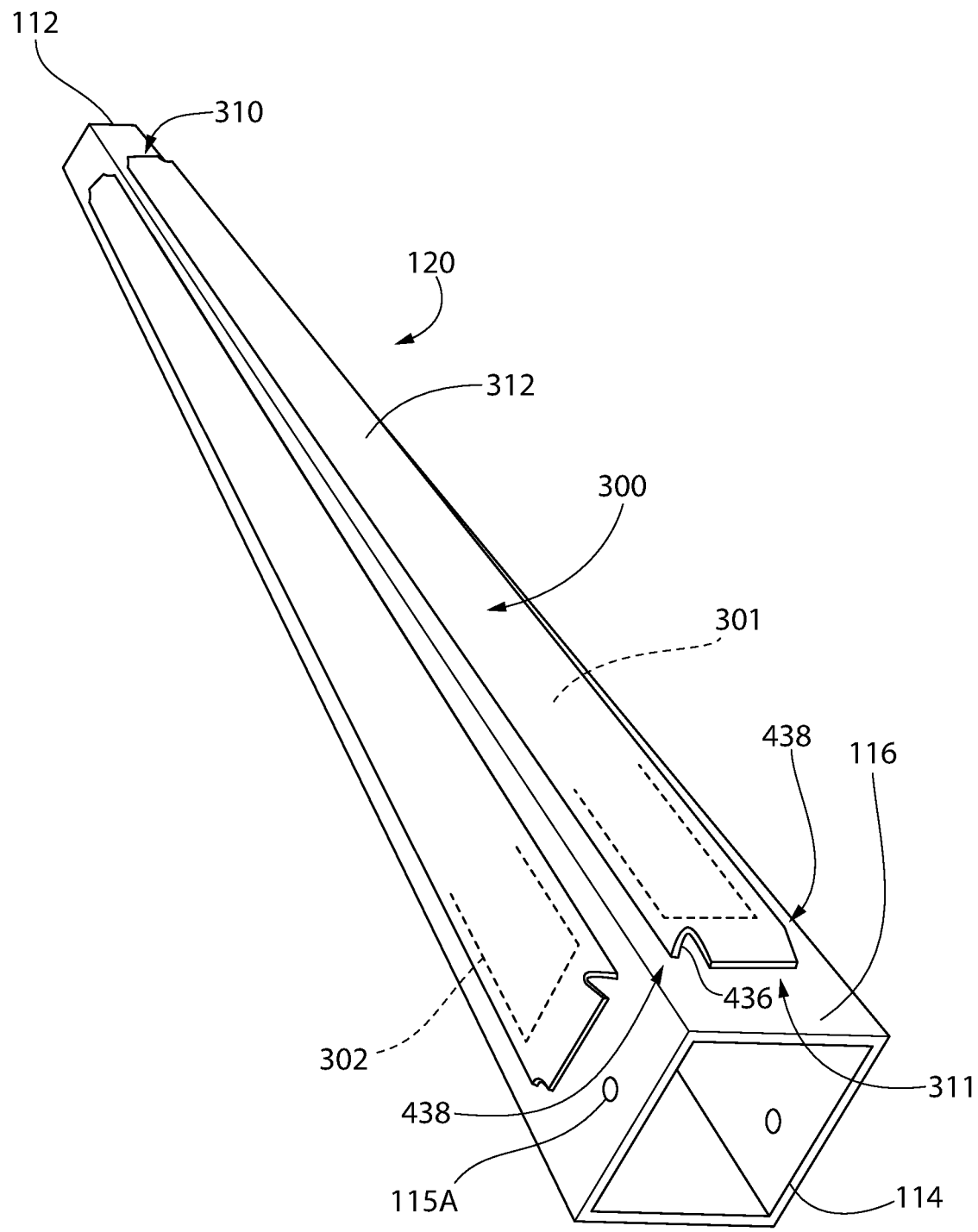
FIG. 4 is a perspective view of a fuel storage tube of the fuel rack showing neutron absorber sheaths.

To facilitate lateral cross flow of cooling water between cells 110 in the fuel rack 100, a minimum of two lateral flow holes 115A may be provided proximate to the lower or bottom end 114 of each tube 120 (see, e.g. FIGS. 4 and 5). Each hole defines top, bottom, and side edges in tube material. In one embodiment, the flow holes 115A may be formed by a punching operation.

Pedestals 200 may have any suitable configuration or shape and be of any suitable type. Each fuel rack 100 may include a plurality of peripheral pedestals 200 spaced apart and arranged along the peripheral edges and perimeter of the baseplate 102, and optionally one or more interior pedestals if required to provide supplemental support for the inboard fuel assemblies and tubes 120B. In one non-limiting embodiment, four peripheral pedestals 200 may be provided each of which is located proximate to one of the four corners 206 of the baseplate. Additional peripheral pedestals may of course be provided as necessary between the corner pedestals on the perimeter of the baseplate. The pedestals are preferably located as outboard as possible proximate to the peripheral edges 208 of the baseplates 102 of each fuel rack or module to give maximum rotational stability to the modules.

With continuing reference to FIGS. 1-5, each fuel rack storage tube 120 in some embodiments may include a longitudinally-extending absorber sheath 300 disposed on one or more tube sidewalls 116. The sheath 300 extends at least over the active zone or height of the fuel rack tubes 120 where the fuel is positioned in the fuel rack 100 (see, e.g. FIG. 5). Sheath 300 has a raised profile or projection from the tube sidewall 116. Sheath 300 has a vertically elongated and generally flat body including top end 310 defining a top lip or edge, bottom end 311 defining a bottom lip or edge 436, and a sidewall 312 extending axially between the top and bottom ends. The top and bottom ends 310, 311 terminate at a point spaced apart from the top and bottom ends 112, 114 of the storage tube 120 as shown. The sheath 300 may be attached to the tube sidewall 116 via welding or another suitable technique. Sheath sidewall 312 is spaced laterally apart from the sidewall 116 of the tube 120 such that each "picture frame" sheath 300 forms an envelope defining a sheathing cavity 301 between the sheath and tube sidewall which is configured for receiving neutron absorber material 302 therein (e.g. in sheet or panel form as represented in FIGS. 4 and 5). The sheath body is therefore configured and laterally offset from the tube sidewall 116 by a distance commensurate with the dimensions and thickness of the absorber sheet or panel inserted therein. The boron-containing material or "poison" may be Boraflex, Tetrabor, (both previously mentioned) or another. In some existing used fuel rack installations, the absorber material 302 may be in a degraded condition thereby requiring augmentation with a neutron absorber apparatus disclosed herein to restore fuel neutron reactivity control to the fuel rack.

FIGS. 6-13 show a neutron absorber apparatus according to the present disclosure. The apparatus may be in the form of a shaped neutron absorber insert 400 configured to be slidably insertable into one of the tubes 120 and cells 110 of the fuel rack 110 shown in FIGS. 1-5 discussed above. Absorber insert 400 includes a plurality of longitudinally-extending neutron absorber walls or plates 402 each comprising a neutron absorber material operable to control reactivity of the fuel stored in the fuel rack cells. The absorber plates 402 may be made of a suitable boron-containing metallic poison material such as without limitation borated aluminum. In some embodiments, without limitation, the absorber plates 402 may be formed of a metal-matrix composite material, and preferably a discontinuously reinforced aluminum/boron carbide metal matrix composite material, and more preferably a boron impregnated aluminum. One such suitable material is sold under the tradename METAMIC™. Other suitable borated metallic materials however may be used. The boron carbide aluminum matrix composite material of which the absorption plates 402 are constructed includes a sufficient amount of boron carbide so that the absorption sheets can effectively absorb neutron radiation emitted from a spent fuel assembly, and thereby shield adjacent spent fuel assemblies in a fuel rack from one another. The absorption plates may be constructed of an aluminum boron carbide metal matrix composite material that is about 20% to about 40% by volume boron carbide. Of course, other percentages may also be used. The exact percentage of neutron absorbing particulate reinforcement which is in the metal matrix composite material, in order to make an effective neutron absorber for an intended application, will depend on a number of factors, including the thickness (i.e., gauge) of the absorption plates 402, the spacing between adjacent cells within the fuel rack, and the radiation levels of the spent fuel assemblies.

In one configuration, absorber insert 400 may comprise an assembly formed by two bent and chevron-shaped angled plates (designated 402A and 402B for convenience of reference), which are held together by metallic upper and lower stiffening bands 404, 406. Each plate 402A, 402B has the shape of a common structural angle sized to fit within the interior dimensions of each fuel rack storage tube 120/cell 110. Absorber plates 402A, 402B may each be formed of a generally flat or planar plate or sheet of neutron absorber material which is mechanically bent along a linear longitudinal bend line BL extending the plate's length L2 to form first and second half-sections 408, 410. The bend line BL may be located midway between the two side edges 412 of the plates 402A or 402B so that each half-section 408, 410 has an equal width W2. In other possible embodiments, the half-sections may have unequal widths. Half-sections 408 and 410 may be arranged mutually perpendicular to each other at a 90-degree angle around the bend line BL in one embodiment as shown.

When the absorber plates 402A, 402B are fastened together via the stiffening bands 404, 406, they collectively form a tubular box frame comprising a four-sided rectilinear absorber tube 424 having a vertical centerline IC and defining an exterior surface 418 and interior surface 420. Interior surface 420 in turn defines a longitudinally-extending and completely open central cavity 422 configured for insertably receiving and holding a nuclear fuel assembly 28 therein (typical fuel assembly shown in FIG. 5). Cavity 422 extends from upper end 414 to lower end 416 of the absorber tube 424. The ends 414 and 416 of the tube are open. Absorber tube 424 and concomitantly cavity 422 may have a square cross sectional shape in one embodiment as shown. Rectangular or other cross sectional tube and cavity shapes may be used in some embodiments depending on the cross sectional shape of the fuel storage tubes 120.

Figure 6:
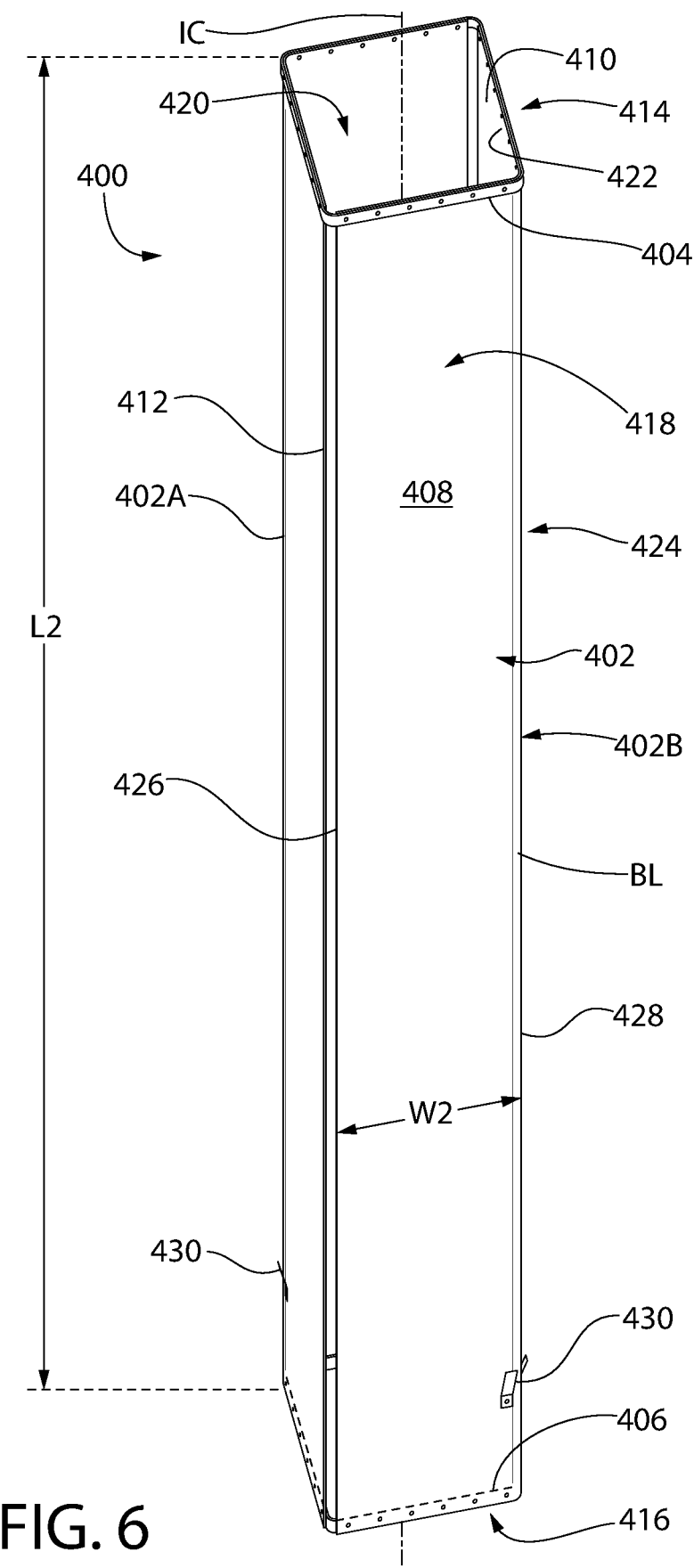
FIG. 6 is perspective view of a neutron absorber insert according to the present disclosure.
Figure 7:
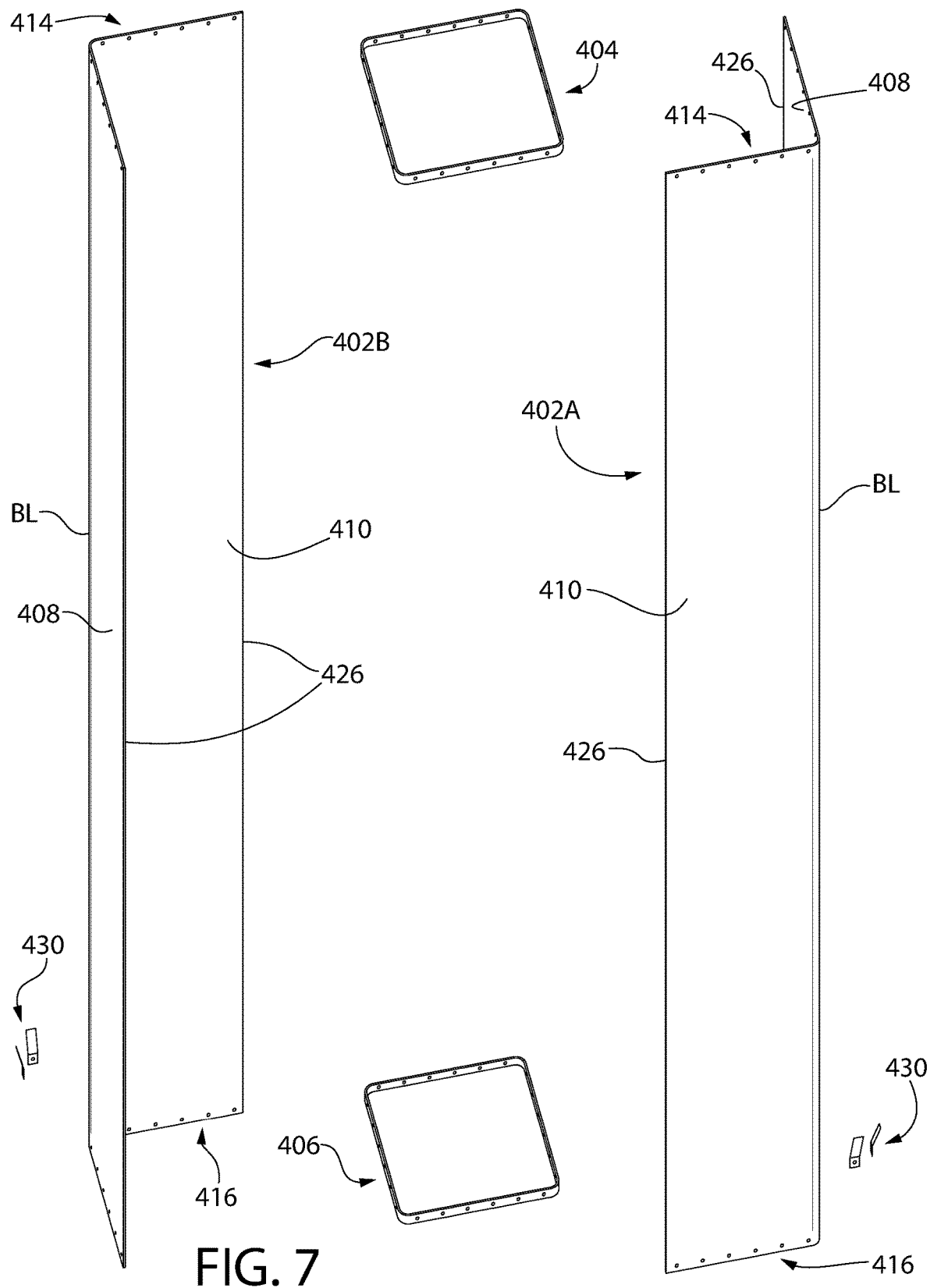
FIG. 7 is an exploded perspective view thereof.
Figure 8:
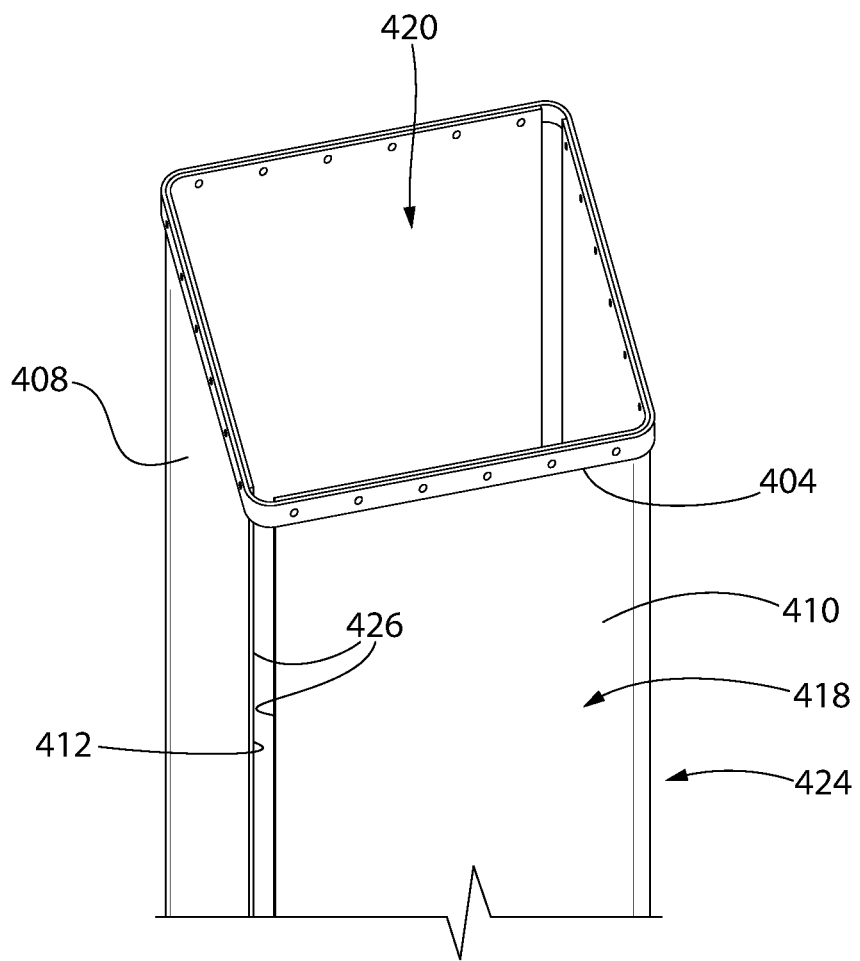
FIG. 8 is a perspective view of a top end of the absorber insert.
Figure 9:
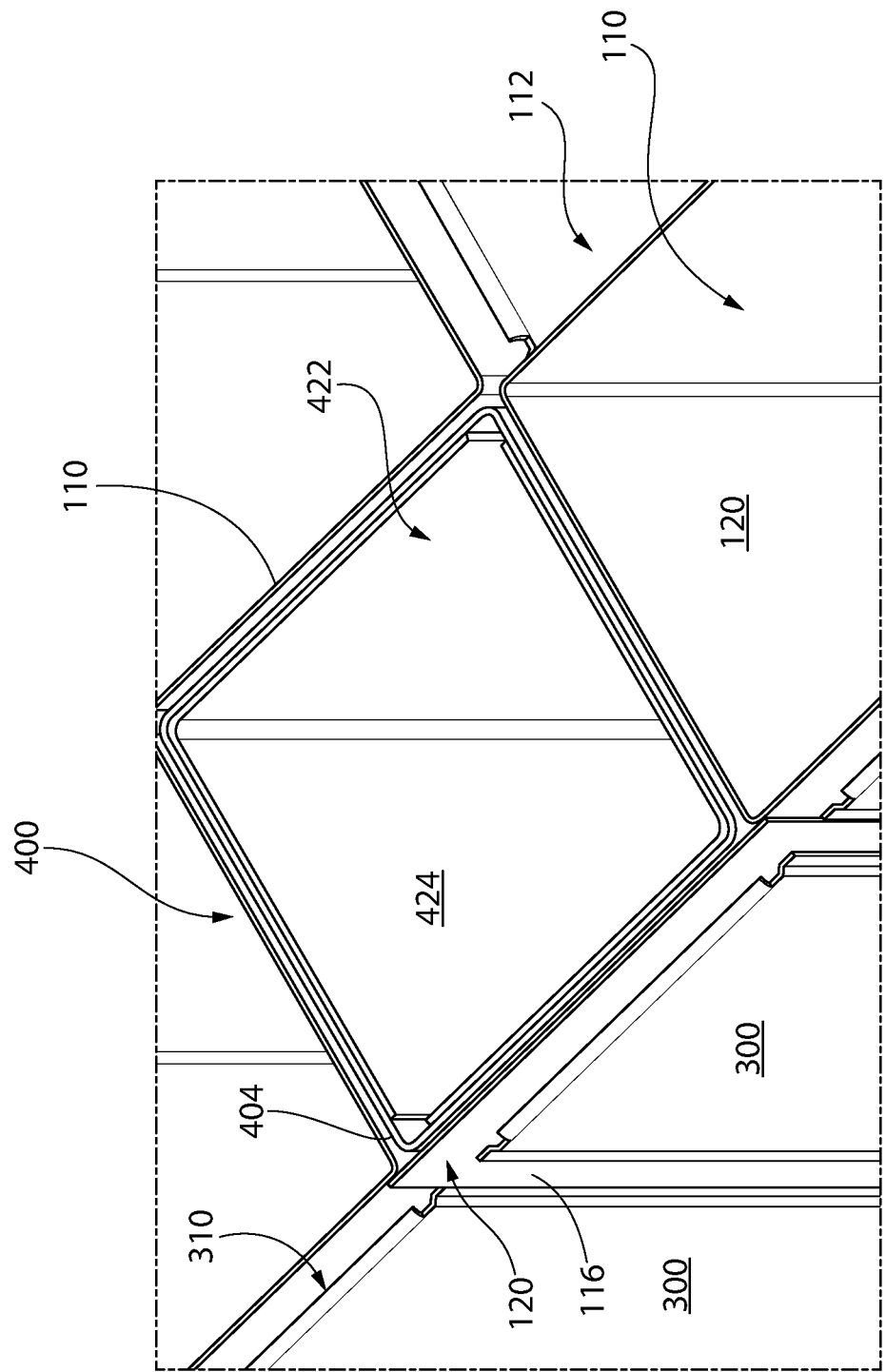
FIG. 9 is a perspective view of the top end of the fuel rack showing the absorber insert installed in one of the storage tubes.

The mating longitudinal edges 426 of the absorber tube plates 402A and 402B may laterally spaced apart in some embodiments forming an axially extending slot 412 for the entire length of the absorber tube assembly (see, e.g. FIG. 6). The slot width is fixed by the upper and lower stiffening bands 404, 406 to which the absorber plates are fastened. In other embodiments, the longitudinal edges 426 of the absorber plates 402A, 402B may be abutted without any appreciable gap.

Upper and lower stiffening bands 404, 406 may be annular ring-like structures having a complementary configuration to the absorber tube 424. Stiffening bands 404, 406 may have a square configuration in the non-limiting illustrated embodiment. The upper and lower bands are attached to the upper and lower extremities of the absorber tube plates 402A, 402B, respectively. Methods used to secure the bands 404, 406 to the upper and lower ends 414, 416 of the plates include for example without limitation welding, riveting, threaded fasteners, or other techniques. The stiffening bands may be made of a corrosion resistant metal, such as stainless steel in one embodiment.

Referring to FIGS. 6-10, the upper stiffening band 404 extends perimetrically around the upper end 414 of the absorber tube 424. The upper stiffening band 404 is sized to closely fit inside the upper region of the fuel storage cell 110/tube 120 with a very small clearance between interior surfaces of the fuel rack storage tube sidewalls 116 and the band, thereby giving the absorber tube 424 structural rigidity and rotational fixity of position in the storage cell at the upper end of the absorber tube. In one embodiment, the upper stiffening band is preferably attached to the exterior surfaces 418 of the absorber tube plates 402A, 402B at the upper end 414 of absorber tube 424. The upper stiffening band may be disposed precisely at the upper end 414 of absorber tube 424 as illustrated, or in other embodiments may be proximate to but spaced vertically downwards apart from the upper end 414. In either case, upper stiffening band 404 is preferably located at an elevation at least above the top end 310 of the absorber sheath 300 on storage tube 120 to prevent interference with the sheath when inserting the absorber tube into the fuel storage cell 110.

Upper stiffening band 404 projects laterally and transversely outwards from and beyond the exterior of the absorber tube 424 to engage the sidewalls 116 of the storage tube. When the absorber tube 424 is installed in one of the fuel rack cells 110 as shown in FIG. 5, the outwards projection of upper stiffening band 404 laterally spaces the absorber tube 424 apart from the interior cell side walls 116. This creates a clearance gap G1 between the exterior surfaces 418 of the absorber tube 424 (formed by tube absorber plates 402A, 402B) and interior surfaces of the cells 110 (formed by the sidewalls 116 of the fuel storage tubes 120). Gap G1 is preferably sized commensurate to the lateral projection depth D2 of the sheaths 300 on the fuel storage tubes 120 to receive the sheaths in the gap when installing the absorber tube 424 in the fuel storage cell 110. This allows the absorber tube 424 to be slideably inserted into the fuel storage cell 110 without interference from the projection of the sheaths 300 outwards from the sidewalls 116 of the storage tube 120 (see, e.g. FIG. 5). Because the sheaths 300 have a longitudinal length which terminates short of the upper and lower ends of the fuel storage tubes 120 as shown in FIG. 4, the upper stiffening band 404 may be fully seated inside the upper end of the storage tube without interference from the sheath (see, e.g. FIG. 9).

Figure 10:
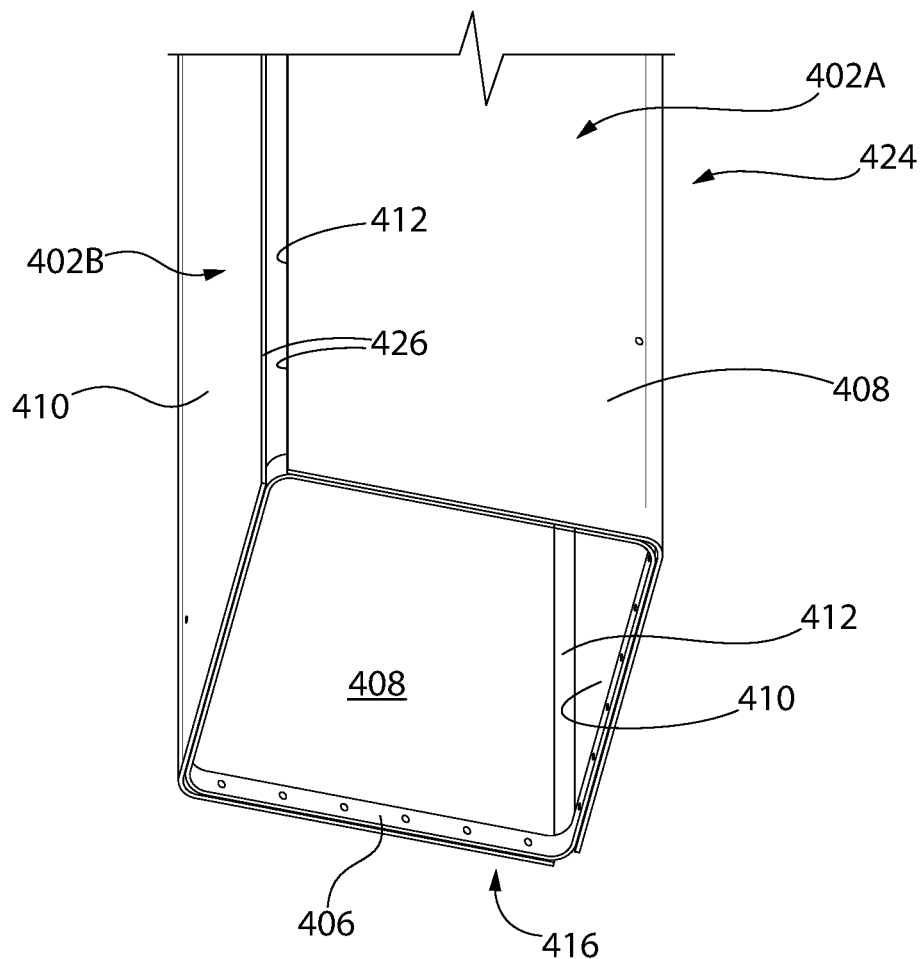
FIG. 10 is a perspective view of the bottom end of the absorber insert.
Figure 11:
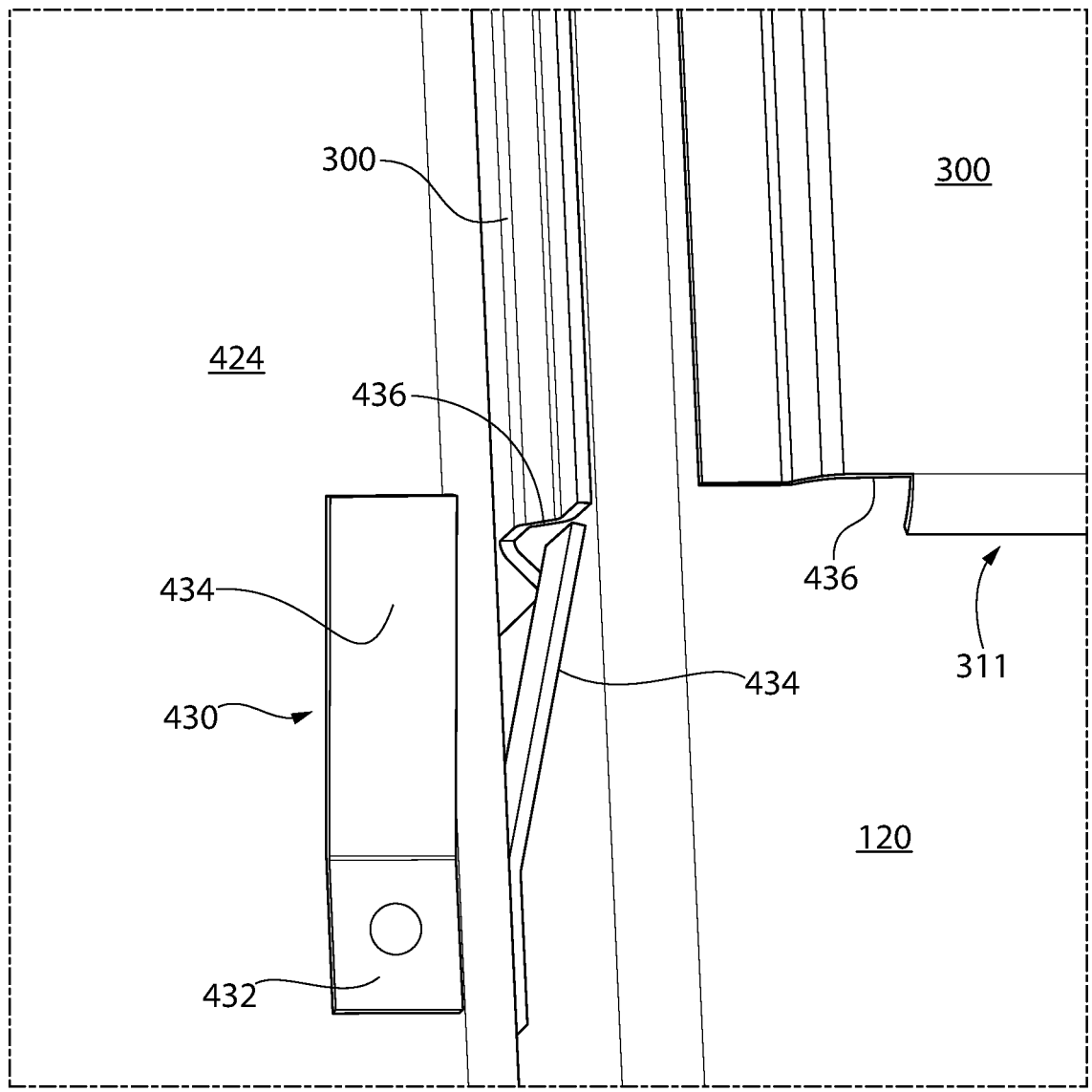
FIG. 11 is a detail perspective view showing locking protrusions of the absorber insert engaging the sheath of a storage tube.

To further avoid interference with the sheaths 300 when the absorber tube 424 is slid into the fuel storage tube 120 through the open top end 112 of the storage tube, the lower stiffening band 406 is instead mounted in the interior or cavity 422 of the absorber tube in one embodiment as best shown in FIG. 10. Lower stiffening band 406 extends perimetrically around the lower end 416 of the absorber tube 424 in cavity 422. The lower stiffening band provides structure rigidity and rotationally fixity in position to the lower end portion of the absorber tube 424 when seated in the fuel storage cell 110.

Lower stiffening band 406 may be completely recessed inside the absorber tube 424 within central cavity 422 wherein the lower end of the tube 424 engages the baseplate 102 of the fuel rack when the absorber insert is fully inserted therein. In alternative embodiments, the lower stiffening band may have an extended length and protrude downwards beyond the lower end 416 of the absorber tube 424 to engage the baseplate 102. If the storage tube 120 has optional lateral flow holes 115A as shown in FIGS. 4 and 5, matching flow holes (not shown) may be provided at corresponding locations in the lower stiffening band 406. When the absorber tube 424 is fully seated in the storage tube 120, the flow holes in absorber tube would become concentrically aligned with the lateral flow holes 115A of the storage tube to preserve fuel pool cooling water cross flow between cells 110.

According to another aspect, the absorber tube 424 may include one or more axial restraints to lock and axially fixate the tube in longitudinal position within the storage cell 110 of the fuel rack 100. Referring to FIGS. 6-11, the axial restraints in one non-limiting embodiment may be formed by elastically deformable locking protrusions comprised of metal leaf spring clips 430. Spring clips 430 each have an elongated body formed of corrosion resistant spring steel. Clips 430 include a lower fixed end portion 432 rigidly attached to the exterior surface 418 of the absorber tube 424 and an opposite resiliently movable cantilevered upper free-end locking portion 434. Fixed end portion 432 may be substantially flat and fixedly attached to absorber tube plates 402A, 402B by any suitable means, such as without limitation welding, riveting, or fasteners in some embodiments. Locking portion 434 extends upwardly from fixed end portion 432 and is obliquely angled thereto forming a space between the locking portion and the absorber tube 424. Locking portion 434 thus projects laterally outwards from the absorber tube 424 (i.e. absorber plates 402A, 402B). When the absorber tube 424 is installed in the fuel rack storage tube 120, locking portion 434 is also obliquely angled to the vertical longitudinal axis LA of the fuel rack (identified in FIG. 2).

The locking spring clips 430 are positioned on the lower half of absorber tube 424 and arranged to engage an available edge disposed on the lower half of the fuel storage tubes 120. In one embodiment, the spring clips may be positioned to engage a free bottom edge 436 of the sheaths 300 which is laterally spaced away from sidewall 116 of the storage tube 120, (see, e.g. FIGS. 4, 5, and 11). The free bottom edges 436 are often formed near the lateral end portions 438 of the bottom end 430 of the sheath 330 where the sheath is not welded or otherwise attached to the storage tube 120. In such configurations, the spring clips 430 may be disposed proximate to the corners 428 of the lower half of the absorber tubes 424 to engage the bottom edges 436 of the sheaths 300. Any suitable number of spring clips 430 may be provided. In one embodiment, at least two spring clips 430 may be provided preferably on different sides of the absorber tube 424. In other embodiments, each of the four sides of the absorber tube may have at least one spring clip. Preferably, at least one spring clip 430 is located to engage one available bottom edge 436 of a sheath 300 of the storage cell 110 in which the absorber tube is installed to lock the absorber tube axially in place in the cell.

It bears noting that at least one of the four storage tube sidewalls 116 inside of each fuel storage cell 110 includes a sheath 300 for engagement by a locking spring clip 430. This single engagement is sufficient to lock the absorber tube 424 in position within the storage cell.

The locking protrusion or spring clip 430 is resiliently movable between an outward an inward deflected and retracted position for sliding the absorber tube 424 into the fuel storage tube 120 or cell 110, and an outward undeflected and extended position for engaging the sheath 300 and locking the absorber tube in position in the fuel rack 100.

Operation of the locking protrusion or spring clip 430 will become evident by describing a method for installing a tubular neutron absorber insert 400 in a storage cell 110 of a fuel rack. A suitable cell 110 may first be selected having at least one available absorber sheath 300 for locking the insert in the fuel rack 100. In one example, cell 110A identified in FIG. 3 may be selected. The fuel rack 100 may be still submerged in the fuel pool 40 and radioactively active. Preferably, a fuel assembly 28 if already present in cell 110A may be removed first.

An absorber insert 400 which may be in the form of absorber tube 424 described above is then positioned over and axially aligned with cell 110A. The locking spring clip or clips 430 are initially in their outward undeflected and extended position (see, e.g. FIG. 11). An overhead hoist or crane may be used to deploy the absorber insert 400. The insert 400 is then slowly lowered into the cell 110A through open top end 112 of the cell. After the lower end 416 of the absorber insert 400 passes through the cell top end 112, at least one of the locking spring clips 430 slideably engages the top end 310 of at least one absorber sheath 300. The spring clip 430 compresses and folds inward to the deflected and retracted position against the absorber tube 424. As the absorber insert 400 continues to be lowered farther into the cell 110A, the locking portion 434 of the spring clip 430 slides along the sidewall 312 of the sheath 300 and remains in the compressed retracted position. When the spring clip 430 eventually passes beneath and reaches a lower elevation in cell 110A below the bottom end 311 of the sheath, the spring clip 430 will snap open via its elastic memory returning to the initial extended position of the spring clip thereby catching and lockingly engaging the bottom edge 436 of sheath 300 (see, e.g. FIGS. 5 and 11). This locking engagement between the sheath 300 and locking portion 434 of spring clip 430 prevents the absorber insert 400 from being axially withdrawn from the fuel rack cell 110A, thereby locking the insert in axial position in the fuel rack. Advantageously, reactivity control to cell 110A is fully restored despite the degraded original boron-containing neutron absorber material which may still be present in the sheath. The open cavity 422 of the low profile absorber insert 400 is configured to allow a fuel assembly 28 to be inserted into cell 110A following the absorber restoration process, and to be removed from the storage cell without requiring removal of the insert.

It bears noting that while the upper stiffening band 404 rotationally and laterally stabilizes the upper portion of the absorber insert 400 in the storage tube 120, the sheath 300 on the tube sidewall and the spring clips 430 act to rotationally and laterally stabilize lower portions of the insert by preventing excessive movement even during a seismic event.

The absorber insert 400 may also be used in some embodiments with a fuel storage tube 120 that does not include an absorber sheath 300 on at least one sidewall 116 for engagement by the spring clip 430, but instead includes an optional flow hole 115A as shown in FIG. 4. In such a case, the spring clip 430 may be configured and arranged on the absorber insert 400 to engage a top edge of the flow hole 115A for locking the insert axially in place in the tube. The insertion process and action of the spring clip 430 is the same as described above, except that the surface of the storage tube sidewall 116 engages the spring clip 430 to fold the clip inwards in the retracted position until it passes below the flow hole 115A. At that elevation, the clip springs or snaps back to the outward undeflected and extended position to lockingly engage the hole.

Figure 12:
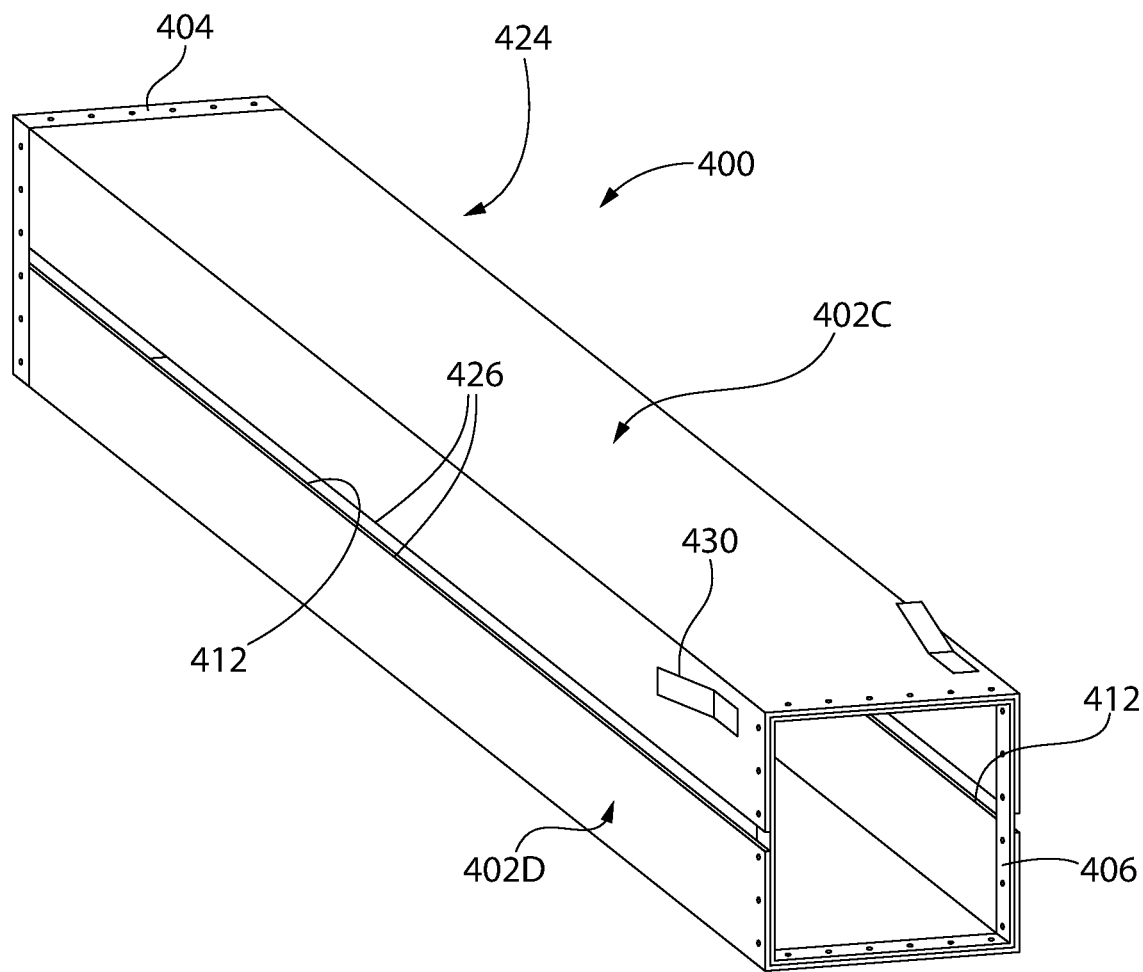
FIG. 12 is a perspective view of an alternative construction of the absorber insert.

FIG. 12 shows an alternative construction of an absorber insert 400 according to the present disclosure. In lieu of the upper and lower stiffening bands 404, 406 coupling two chevron-shaped or angled absorber plates 402A, 402B together as shown in FIG. 6, each absorber plate 402C, 402D may be shaped as a structural channel. A longitudinal slot 412 may be formed between mating edges 426 of the plates 402C and 402D as shown in FIG. 12. All other element of construction including spring clips 430 and stiffening bands 404, 406 may otherwise be the same as absorber plates 402A, 402B described herein.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A method for installing a neutron absorber apparatus in a nuclear fuel storage rack, the method comprising:
   providing a vertically upright fuel rack comprising a plurality of elongated storage cells extending along a longitudinal axis, each cell having a plurality of cell sidewalls defining an upwardly open cell cavity configured for storing nuclear fuel;
   positioning an elongated absorber insert over a selected cell;
   lowering the absorber insert into the select cell; and
   lockingly engaging an elastically deformable locking protrusion disposed on the absorber insert with a sheath defining a sheathing cavity configured for holding a neutron absorber material disposed on one sidewall of the selected cell;
   wherein the sheath axially restrains and prevents removal of the absorber insert from the selected cell.

2. The method according to claim 1, wherein the lowering step includes inserting the absorber insert downwards through an open top end of the selected cell.

3. The method according to claim 1, wherein the locking protrusion is resiliently movable between an undeflected outward extended position and a deflected inward retracted position via engagement with the sheath.

4. The method according to claim 3, wherein the lowering step includes slideably engaging a top end of the sheath which moves the locking protrusion from the outward extended position to the inward retracted position.

5. The method according to claim 4, wherein the lowering step includes sliding the locking protrusion downwards along a sidewall of the sheath from the top end of the sheath to a bottom end of the sheath while the locking protrusion remains in the inward retracted position.

6. The method according to claim 5, wherein the locking protrusion snaps back to the outward extended position when the locking protrusion passes below the bottom end of the sheath.

7. The method according to claim 6, wherein the locking protrusion engages a corner bottom edge of the sheath which prevents the absorber insert from being axially withdrawn from the selected cell.

8. The method according to claim 1, wherein the sheath is vertically elongated and extends for a majority of a height of the one sidewall of the selected cell.

9. The method according to claim 1, wherein the locking protrusion engages a bottom edge of the sheath.

10. The method according to claim 1, wherein the locking protrusion is a spring clip having a lower fixed end portion rigidly attached to absorber insert and an angled upper cantilevered free end portion engaged with the sheath.

11. The method according to claim 1, wherein:
    the locking protrusion is resiliently movable from an outward extended position to an inward retracted position by engaging a top edge of the sheath when the insert is lowered into the selected cell; and
    the locking protrusion is resiliently movable from the inward retracted position back to the outward extended position to lockingly engage a bottom edge of the sheath when the locking protrusion is positioned at an elevation below the sheath.

12. The method according to claim 1, wherein the locking protrusion is disposed proximate to a lower end of the insert.

13. The method according to claim 1, wherein the absorber insert has a tubular construction formed by an assembly of a longitudinally-extending first absorber plate and second absorber plate coupled together at their upper and lower extremities by respective upper and lower stiffening bands attached to the plates.

14. The method according to claim 13, wherein the lower stiffening band is disposed inside the absorber insert to avoid interference with the sheath when the absorber insert is lowered into the selected cell.

15. The method according to claim 1, wherein the absorber insert defines a longitudinally-extending central cavity configured for holding a nuclear fuel assembly therein.

16. The method according to claim 13, wherein each of the first and second absorber plates has a chevron cross-sectional shape.

17. The method according to claim 13, wherein each of the first and second absorber plates has a channel cross-sectional shape.

18. The method according to claim 13, wherein the locking protrusion is disposed proximate to a longitudinally-extending corner and a bottom end of the absorber insert to engage a lateral end portion of a bottom edge of the sheath.

19. A method for installing a neutron absorber apparatus in a nuclear fuel storage rack, the method comprising:
    providing a vertically upright fuel rack comprising a plurality of elongated storage cells extending along a longitudinal axis, each cell comprising a plurality of cell sidewalls defining an upwardly open cell cavity configured for storing nuclear fuel;
    providing a longitudinally elongated sheath on one sidewall of a first cell, the sheath defining a sheathing cavity configured for holding neutron absorber material;

positioning an absorber tube formed of a neutron absorbing material over the first cell, the absorber tube including a deformable spring clip resiliently movable between an outward extended position and an inward retracted position;

sliding the absorber tube downwards through a top end of and into the first cell;

engaging the spring clip with a top end of the sheath which moves the spring clip from the outwards extended position to the inward retracted position;

sliding the spring clip in the inward retracted position downwards along the sheath with the absorber tube;

passing the spring clip below a bottom end of the sheath, wherein the spring clip automatically returns to the outward extended position; and locking engaging the spring clip with the bottom end of the sheath, wherein the sheath axially restrains and prevents removal of the absorber insert from the first cell.

20. The method according to claim 19, wherein the spring clip engages a bottom edge of the sheath proximate to a longitudinal corner of the absorber tube.

\* \* \* \* \*